(12) United States Patent
Nam et al.

(10) Patent No.: US 12,523,707 B2
(45) Date of Patent: Jan. 13, 2026

(54) BATTERY MANAGEMENT SYSTEM, BATTERY MANAGEMENT METHOD, BATTERY PACK, AND ELECTRIC VEHICLE

(71) Applicant: LG Energy Solution, Ltd., Seoul (KR)

(72) Inventors: Gi-Min Nam, Daejeon (KR); Hyeong-Seok Kim, Daejeon (KR); Eun-Yong Park, Daejeon (KR); Ji-Hyun Choi, Daejeon (KR); Won-Tae Joe, Daejeon (KR); Song-Taek Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 511 days.

(21) Appl. No.: 18/005,790

(22) PCT Filed: Aug. 5, 2021

(86) PCT No.: PCT/KR2021/010343
§ 371 (c)(1),
(2) Date: Jan. 17, 2023

(87) PCT Pub. No.: WO2022/035131
PCT Pub. Date: Feb. 17, 2022

(65) Prior Publication Data
US 2023/0280408 A1 Sep. 7, 2023

(30) Foreign Application Priority Data
Aug. 13, 2020 (KR) .................. 10-2020-0101934

(51) Int. Cl.
*G01R 31/3842* (2019.01)
*B60L 53/00* (2019.01)
(Continued)

(52) U.S. Cl.
CPC .......... *G01R 31/3842* (2019.01); *B60L 53/00* (2019.02); *B60L 58/12* (2019.02);
(Continued)

(58) Field of Classification Search
CPC ... G01R 31/3842; G01R 31/367; B60L 53/00; B60L 58/12; H02J 7/00712; H02J 7/0047;
(Continued)

(56) References Cited

U.S. PATENT DOCUMENTS 6,087,810 A 7/2000 Yoshida
10,122,042 B2 11/2018 Krasovitsky et al.
(Continued)

FOREIGN PATENT DOCUMENTS

CN 102474124 A 5/2012
CN 109546704 A 3/2019
(Continued)

OTHER PUBLICATIONS

Extended European Search Report including Written Opinion for Application No. 21856137.1 dated Oct. 28, 2024, 9 pages.
(Continued)

*Primary Examiner* — Nathaniel R Pelton
(74) *Attorney, Agent, or Firm* — Lerner David LLP

(57) ABSTRACT

A battery management system includes a sensing unit to generate a sensing signal indicating a battery voltage and a battery current of a battery, a memory unit to store a charge map recording a correlation between first to $n^{th}$ reference state of charge (SOC) ranges, first to $n^{th}$ reference currents and first to $n^{th}$ reference voltages for multi-stage constant-current charging, and a control unit to change to constant voltage charging using a $k^{th}$ reference voltage corresponding to a $k^{th}$ reference SOC range in response to the battery voltage having reached the $k^{th}$ reference voltage during constant current charging using a $k^{th}$ reference current corresponding to the $k^{th}$ reference SOC range to which an SOC of the battery belongs. The control unit updates the $k^{th}$ (Continued)

reference current of the charge map based on a time-series of the battery current in a charging period of the constant voltage charging.

10 Claims, 5 Drawing Sheets

(51) Int. Cl.
    *B60L 58/12*     (2019.01)
    *G01R 31/367*     (2019.01)
    *H01M 10/42*     (2006.01)
    *H01M 10/44*     (2006.01)
    *H01M 10/46*     (2006.01)
    *H01M 10/48*     (2006.01)
    *H02J 7/00*     (2006.01)

(52) U.S. Cl.
    CPC ........ *G01R 31/367* (2019.01); *H01M 10/425* (2013.01); *H01M 10/44* (2013.01); *H01M 10/46* (2013.01); *H01M 10/48* (2013.01); *H02J 7/0047* (2013.01); *H02J 7/00712* (2020.01); *H01M 2010/4271* (2013.01)

(58) Field of Classification Search
    CPC .... H01M 10/425; H01M 10/44; H01M 10/46; H01M 10/47; H01M 10/48
    USPC .......................................................... 320/162
    See application file for complete search history.

(56) References Cited

U.S. PATENT DOCUMENTS

| | | |
|---|---|---|
| 2003/0006735 A1 | 1/2003 | Kawakami et al. |
| 2011/0037438 A1 | 2/2011 | Bhardwaj et al. |
| 2011/0285357 A1 | 11/2011 | Kikuchi et al. |
| 2012/0086406 A1 | 4/2012 | Maeagawa |
| 2012/0169284 A1* | 7/2012 | Park .................... H02J 7/04 320/112 |
| 2013/0335034 A1 | 12/2013 | Suzuki et al. |
| 2015/0340885 A1 | 11/2015 | Baek et al. |
| 2018/0145531 A1 | 5/2018 | Jung et al. |
| 2019/0363546 A1* | 11/2019 | Abe ................ H02J 7/0047 |
| 2022/0006313 A1* | 1/2022 | Lim .................. H01M 10/486 |
| 2024/0136844 A1 | 4/2024 | Lim et al. |

FOREIGN PATENT DOCUMENTS

| | | |
|---|---|---|
| CN | 107039696 B | 4/2019 |
| CN | 107819165 B | 2/2020 |
| JP | H09121462 A | 5/1997 |
| JP | 2002191136 A | 7/2002 |
| JP | 2003059544 A | 2/2003 |
| JP | 2008220121 A | 9/2008 |
| JP | 4689768 B2 | 5/2011 |
| JP | 4805863 B2 | 11/2011 |
| JP | 5022623 B2 | 9/2012 |
| JP | 5620423 B2 | 11/2014 |
| JP | 2015186316 A | 10/2015 |
| JP | 2018082618 A | 5/2018 |
| JP | 2019205242 A | 11/2019 |
| JP | 2021523663 A | 9/2021 |
| KR | 19960039526 | 11/1996 |
| KR | 101680324 B1 | 11/2016 |
| KR | 20170022778 A | 3/2017 |
| KR | 20170142055 A | 12/2017 |
| WO | 2010137334 A1 | 12/2010 |
| WO | 2011061902 A1 | 5/2011 |
| WO | 2012127775 A1 | 9/2012 |
| WO | 2020130324 A1 | 6/2020 |

OTHER PUBLICATIONS

International Search Report for Application No. PCT/KR2021/010343 mailed Nov. 22, 2021, pp. 1-3.

* cited by examiner

BATTERY MANAGEMENT SYSTEM, BATTERY MANAGEMENT METHOD, BATTERY PACK, AND ELECTRIC VEHICLE

CROSS-REFERENCE TO RELATED APPLICATIONS

The present application is a national phase entry under 35 U.S.C. § 371 of International Application No. PCT/KR2021/010343 filed on Aug. 5, 2021, which claims priority from Korean Patent Application No. 10-2020-0101934 filed on Aug. 13, 2020, all of which are incorporated herein by reference.

TECHNICAL FIELD

The present disclosure relates to battery charge control.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be charged and discharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

In the constant current charging of a battery, when the current rate of the charge current is low, it takes a very long time to fully charge the battery. In contrast, when the current rate of the charge current is too high, the battery degrades fast.

One of charge protocols proposed to solve this problem is 'multi-stage constant-current charging', namely, stepwise adjustment of the current rate of the charge current according to the State Of Charge (SOC) or voltage of the battery during charging. The current rate is a value obtained by dividing the charge current by the maximum capacity of the battery, and may be referred to as 'C-rate', and it's unit is 'C'. A multi-stage constant-current charge map includes at least one data array recording a correlation between a plurality of C-rates and a plurality of SOC ranges. A charging procedure using the multi-stage constant-current charge map includes repeating the process of supplying the charge current of the next C-rate to the battery each time the SOC of the battery reaches the upper limit value of each SOC range.

As the battery degrades from Beginning Of Life (BOL), degradation by the same C-rate may be accelerated. However, the charging procedure using the conventional multi-stage constant-current charge map does not consider the degradation of the battery.

SUMMARY

Technical Problem

The present disclosure is designed to solve the above-described problem, and therefore the present disclosure is directed to providing a battery management system, a battery management method, a battery pack and an electric vehicle, in which a multi-stage constant-current charge map is updated based on battery voltage and battery current monitored during charging using the multi-stage constant-current charge map.

The present disclosure is further directed to providing a battery management system, a battery management method, a battery pack and an electric vehicle, in which even though the charging procedure ends after it is performed on only some of a plurality of State Of Charge (SOC) ranges, the C-rate of each of the remaining SOC ranges is updated based on the C-rate update results of the SOC ranges having undergone the charging procedure.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery management system according to an aspect of the present disclosure includes a voltage sensor configured to measure a battery voltage of a battery, a current sensor configured to measure a battery current of a battery, a controller, and a memory configured to store a charge map recording a correlation between first to $n^{th}$ reference state of charge (SOC) ranges, first to $n^{th}$ reference currents and first to $n^{th}$ reference voltages for multi-stage constant-current charging, respectively, the memory having programmed thereon instructions that, when executed by the controller, cause the controller to in response to a charge start command, start constant current charging using a $k^{th}$ reference current corresponding to a $k^{th}$ reference SOC range, wherein an SOC of the battery is within the $k^{th}$ reference SOC range, change from the constant current charging to constant voltage charging using a $k^{th}$ reference voltage in response to the battery voltage having reached the $k^{th}$ reference voltage corresponding to the $k^{th}$ reference SOC range before the SOC of the battery reaches an upper limit value of the $k^{th}$ reference SOC range during the constant current charging. The control unit is configured to update the $k^{th}$ reference current of the charge map based on a time-series of the battery current in a charging period of the constant voltage charging in response to the SOC of the battery having reached the upper limit value of the $k^{th}$ reference SOC range during the constant voltage charging. n is a natural number of 2 or greater, and k is a natural number of n or smaller.

The instructions may be configured to cause the controller to determine an average current in the charging period from the time-series of the battery current, and update the $k^{th}$ reference current to be equal to the average current.

The instructions may be configured to cause the controller to determine an average current in the charging period from the time-series of the battery current, update the $k^{th}$ reference current to be equal to a sum of (i) the $k^{th}$ reference current multiplied by a first weight and (ii) the average current multiplied by a second weight.

Each of the first weight and the second weight may be a positive number of less than 1, and a sum of the first weight and the second weight may be 1.

The instructions may be configured to cause the controller to update each remaining reference current among the first to $n^{th}$ reference currents except the $k^{th}$ reference current based on a ratio between the updated $k^{th}$ reference current and the $k^{th}$ reference current.

A battery pack according to another aspect of the present disclosure includes the battery management system of any of the embodiments described herein.

An electric vehicle according to still another aspect of the present disclosure includes the battery pack.

A battery management method according to yet another aspect of the present disclosure includes in response to a charge start command, starting, by a controller, constant current charging using a $k^{th}$ reference current corresponding to a $k^{th}$ reference state of charge (SOC) range, wherein an SOC of the battery is within a $k^{th}$ reference SOC range, and wherein the $k^{th}$ reference current corresponds to the $k^{th}$ reference SOC range in a charge map correlating first to $n^{th}$ reference SOC ranges with first to $n^{th}$ reference currents and first to $n^{th}$ reference voltages for multi-stage constant-current charging, changing, by the controller, from the constant current charging to constant voltage charging using a $k^{th}$ reference voltage in response to a battery voltage having reached the $k^{th}$ reference voltage corresponding to the $k^{th}$ reference SOC range before the SOC of the battery reaches an upper limit value of the $k^{th}$ reference SOC range during the constant current charging, and updating, by the controller, the $k^{th}$ reference current of the charge map based on a time-series of a battery current in a charging period of the constant voltage charging in response to the SOC of the battery having reached the upper limit value of the $k^{th}$ reference SOC range during the constant voltage charging. n is a natural number of 2 or greater, and k is a natural number of n or smaller.

Updating the $k^{th}$ reference current of the charge map may include determining, by the controller, an average current over the charging period from the time-series of the battery current, and updating, by the controller, the $k^{th}$ reference current to be equal to the average current.

The battery management method may further include updating, by the controller, each remaining reference current among the first to $n^{th}$ reference currents except the $k^{th}$ reference current based on a ratio between the $k^{th}$ reference current and the updated $k^{th}$ reference current.

Advantageous Effects

According to at least one of the embodiments of the present disclosure, it is possible to update a multi-stage constant-current charge map based on battery voltage and battery current monitored during charging using the multi-stage constant-current charge map.

Additionally, according to at least one of the embodiments of the present disclosure, even though the charging procedure ends after it is performed on only some of a plurality of State Of Charge (SOC) ranges, the C-rate of each of the remaining SOC ranges may be updated based on the C-rate update results of the SOC ranges having undergone the charging procedure.

The effects of the present disclosure are not limited to the effects mentioned above, and these and other effects will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Figure 1:
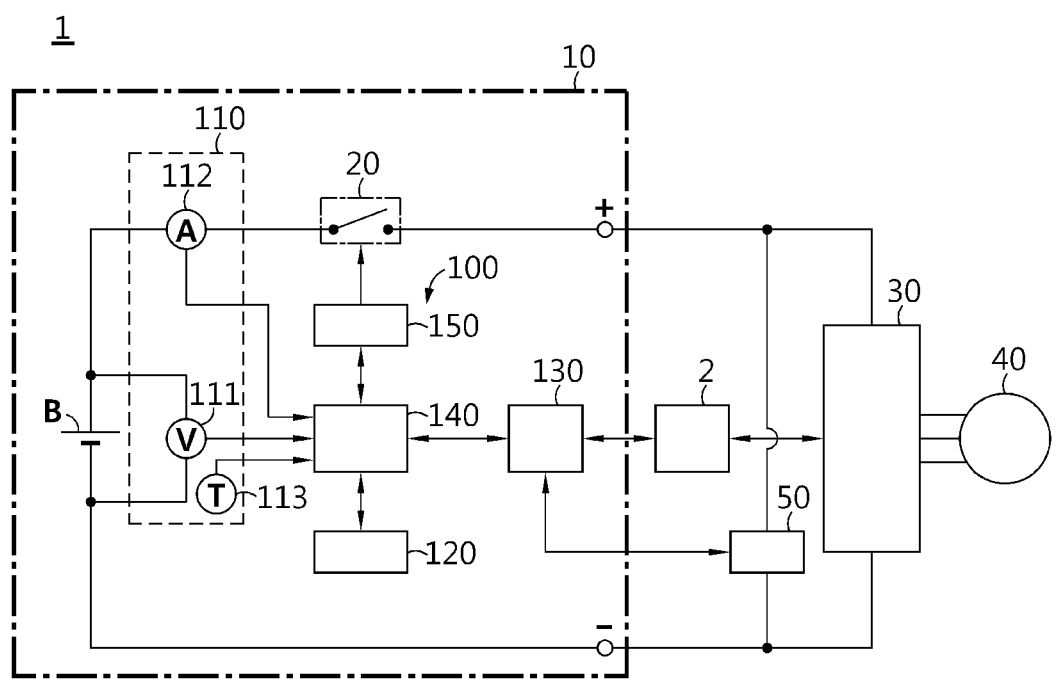
FIG. 1 is a diagram exemplarily showing a configuration of an electric vehicle according to the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" refers to a processing unit of at least one function or operation, and this may be implemented by hardware and software either alone or in combination.

In addition, throughout the specification, it will be further understood that when an element is referred to as being "connected to" another element, it can be directly connected to the other element or intervening elements may be present.

FIG. 1 is a diagram exemplarily showing a configuration of an electric vehicle according to the present disclosure.

Referring to FIG. 1, the electric vehicle 1 includes a battery pack 10, an inverter 30, an electric motor 40 and a charging circuit 50.

The battery pack 10 includes a battery B, a switch 20 and a battery management system 100.

The battery B includes at least one battery cell. Each battery cell is not limited to a particular type, and may include any battery cell that can be repeatedly recharged such as, for example, a lithium ion cell. The battery B may be coupled to the inverter 30 and/or the charging circuit 50 through a pair of power terminals provided in the battery pack 10.

The switch 20 is connected in series to the battery B. The switch 20 is installed on a current path for the charge/discharge of the battery B. The on/off of the switch 20 is controlled in response to a switching signal from the battery management system 100. The switch 20 may be a mechanical relay that is turned on/off by the electromagnetic force of a coil or a semiconductor switch such as a Metal Oxide Semiconductor Field Effect transistor (MOSFET).

The inverter 30 is provided to convert the direct current (DC) from the battery B to alternating current (AC) in response to a command from the battery management system 100. The electric motor 40 may be, for example, a three-phase AC motor. The electric motor 40 works using the AC power from the inverter 30.

The battery management system 100 may be responsible for the general control related to the charge/discharge of the battery B. The battery management system 100 includes a sensing unit 110, a memory unit 120 and a control unit 140. The battery management system 100 may further include at least one of an interface unit 130 or a switch driver 150.

The sensing unit 110 includes a voltage sensor 111 and a current sensor 112. The sensing unit 110 may further include a temperature sensor 113.

The voltage sensor 111 is connected in parallel to the battery B and configured to detect a battery voltage across the battery B and generate a voltage signal indicating the detected battery voltage. The current sensor 112 is connected in series to the battery B through the current path. The current sensor 112 is configured to detect a battery current flowing through the battery B and generate a current signal indicating the detected battery current. The temperature sensor 113 is configured to detect a temperature of the battery B and generate a temperature signal indicating the detected temperature.

The memory unit 120 may include at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM) or programmable read-only memory (PROM). The memory unit 120 may store data and programs required for the computation operation by the control unit 140. The memory unit 120 may store data indicating the result of the computation operation by the control unit 140.

The memory unit 120 stores a charge map. The charge map may be pre-stored in the memory unit 120 before the battery management system 100 is loaded, or may be received from, for example, a battery manufacturer or the like, or a high-level controller 2 through the interface unit 130.

The charge map is used in the charging procedure for multi-stage constant-current charging of the battery B. The charge map stores a correlation between first to $n^{th}$ reference SOC ranges, first to $n^{th}$ reference currents and first to $n^{th}$ reference voltages for multi-stage constant-current charging. n is a natural number 2 or greater. The earlier reference current may be smaller than the later reference current.

The interface unit 130 may include a communication circuit configured to support wired or wireless communication between the control unit 140 and the high-level controller 2 (for example, Electronic Control Unit (ECU)). The wired communication may be, for example, controller area network (CAN) communication, and the wireless communication may be, for example, Zigbee or Bluetooth communication. The communication protocol is not limited to a particular type, and may include any communication protocol that supports the wired/wireless communication between the control unit 140 and the high-level controller 2. The interface unit 130 may include an output device (for example, a display, a speaker) to provide the information received from the control unit 140 and/or the high-level controller 2 in a recognizable format. The high-level controller 2 may control the inverter 30 based on battery information (for example, voltage, current, temperature, SOC) collected through the communication with the battery management system 100.

The control unit 140 may be operably coupled to the high-level controller 2, the switch 20, the charging circuit 50, the sensing unit 110, the memory unit 120, the interface unit 130 and/or the switch driver 150. Operably coupled refers to directly/indirectly connected to transmit and receive a signal in one or two directions.

The switch driver 150 is electrically coupled to the control unit 140 and the switch SW. the switch driver 150 is configured to selectively turn on/off the switch SW in response to a command from the control unit 140. The control unit 140 may command the switch driver 150 to turn on the switch SW during the charging procedure.

The control unit 140 may collect a sensing signal from the sensing unit 110. The sensing signal indicates the detected voltage signal, the detected current signal and/or the detected temperature signal in synchronization.

The control unit 140 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions.

The interface unit 130 may relay the bi-directional communication between the control unit 140 and the charging circuit 50 and the bi-directional communication between the control unit 140 and the high-level controller 2. The charging circuit 50 is configured to supply a charge current of a C-rate requested from the battery management system 100 to the battery B. The charging circuit 50 may be configured to supply a charge voltage having a voltage level requested from the battery management system 100 to the battery B. The control unit 140 is configured to start the charging procedure using the charge map in response to receiving a charge start command through the interface unit 130. The control unit 140 may terminate the charging procedure using the charge map in response to receiving a charge stop command through the interface unit 130.

The control unit 140 may be determine the SOC of the battery B based on the sensing signal. In determining the SOC, a well-known algorithm such as an open circuit voltage (OCV)-SOC curve, ampere counting, Kalman filter may be used.

Figure 2:
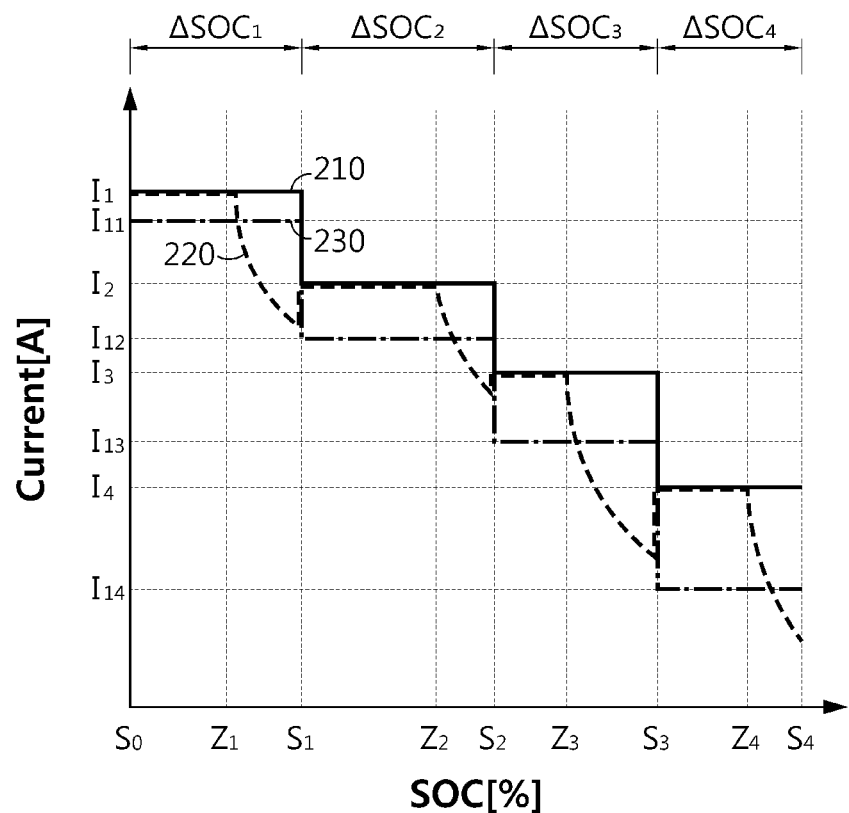
FIG. 2 is a diagram exemplarily showing a correlation between a reference state of charge (SOC) range and a reference current recorded in a charge map.
Figure 3:
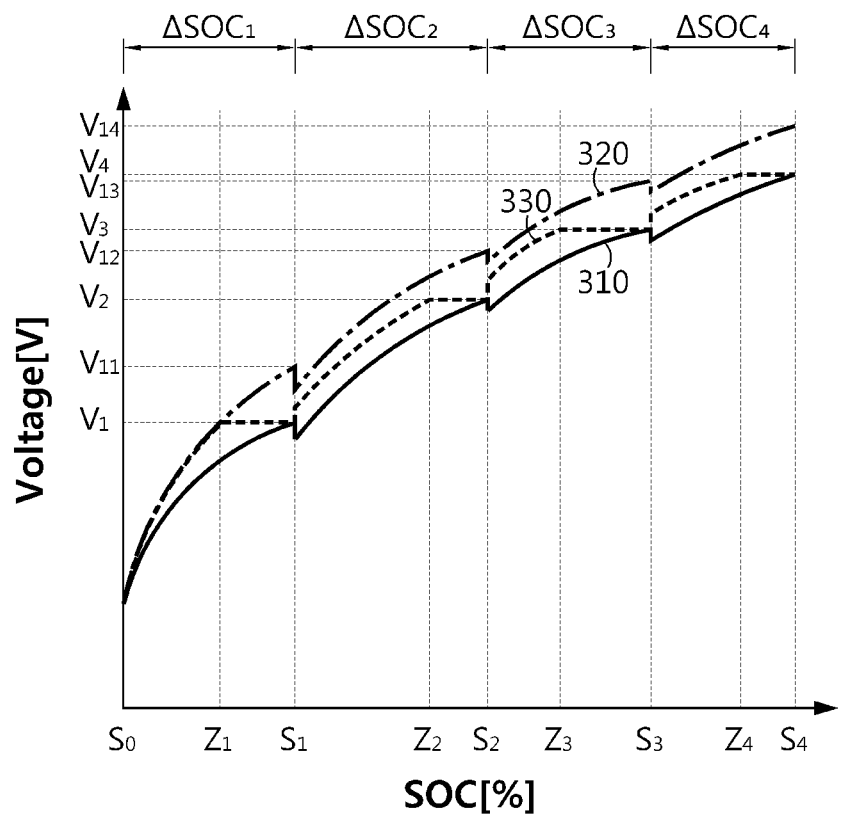
FIG. 3 is a diagram exemplarily showing a correlation between a reference SOC range and a reference voltage recorded in a charge map.

FIG. 2 is a diagram exemplarily showing the correlation between the reference SOC range and the reference current recorded in the charge map, and FIG. 3 is a diagram exemplarily showing the correlation between the reference SOC range and the reference voltage recorded in the charge map. For convenience of description, FIGS. 2 and 3 show n=4, i.e., the charge map defines the correlation between four reference SOC ranges, four reference currents and four reference voltages.

A first current profile 210 shown in FIG. 2 indicates the correlation between the first to fourth reference SOC ranges $\Delta SOC_1 \sim \Delta SOC_4$ and the first to fourth reference currents $I_1 \sim I_4$ for the battery B at Beginning Of Life (BOL). The first current profile 210 may be recorded in the charge map in the format of a data table. When k is a natural number of n or smaller, $S_k$ is the upper limit value of the $k^{th}$ reference SOC range $\Delta SOC_k$. When m is a natural number of less than n, $S_m$ is equal to the lower limit value of the $m+1^{th}$ reference SOC range $\Delta SOC_{m+1}$. For example, $S_1$ is the lower limit value of the second reference SOC range $\Delta SOC_2$ having $S_2$ as the upper limit value. The lower limit value $S_0$ of the first reference SOC range $\Delta SOC_1$ may be 0 [%].

When the SOC of the battery B is in the $m^{th}$ reference SOC range $\Delta SOC_m$, the control unit 140 may command constant current charging using the $m^{th}$ reference current $I_m$ to the charging circuit 50.

During constant current charging using the $m^{th}$ reference current $I_m$, when the SOC of the battery B reaches the upper limit value $S_m$ of the $m^{th}$ reference SOC range $\Delta SOC_m$, the control unit 140 may command constant current charging using the $m+1^{th}$ reference current $I_{m+1}$ to the charging circuit 50.

During constant current charging using the $n^{th}$ reference current $I_n$, when the SOC of the battery B reaches the upper limit value $S_n$ of the $n^{th}$ reference SOC range $\Delta SOC_n$, the control unit 140 may command constant voltage charging to the charging circuit 50. Accordingly, the multi-stage constant-current charging using the charge map may end and be changed to constant voltage charging.

A first voltage profile 310 shown in FIG. 3 shows the correlation between the first to fourth reference SOC ranges $\Delta SOC_1 \sim \Delta SOC_4$ and the first to fourth reference voltages $V_1 \sim V_4$ for the battery B at BOL. The first voltage profile 310 may be recorded in the charge map in the format of a data table. Vk is preset as the reference voltage indicating the battery voltage when the SOC of the battery B at BOL reaches the upper limit value $S_k$ of the $k^{th}$ reference SOC range $\Delta SOC_k$ by the $k^{th}$ reference current $I_k$.

Meanwhile, as described above, as the battery B gradually degrades, the voltage rise by the same magnitude of charge current gets faster compared to when the battery B is at BOL. Accordingly, the battery voltage having reached the $k^{th}$ reference voltage $V_k$ during constant current charging using the $k^{th}$ reference current $I_k$ of the charge map indicates that the battery B degraded compared to when the battery B is at BOL A second voltage profile 320 shown in FIG. 3 indicates a change in battery voltage monitored through the constant current charging process of the degraded battery B using the first to fourth reference currents $I_1 \sim I_4$ in a sequential order for each of the first to fourth reference SOC ranges $\Delta SOC_1 \sim \Delta SOC_4$. Referring to the second voltage profile 320, $V_{1k}$ is the battery voltage when the SOC of the degraded battery B reaches the upper limit value $S_k$ of the $k^{th}$ reference SOC range $\Delta SOC_k$, and is found larger than the $k^{th}$ reference voltage $V_k$. That is, $V_{11} > V_1$, $V_{12} > V_2$, $V_{13} > V_3$, $V_{14} > V_4$.

Since the $k^{th}$ reference voltage $V_k$ is the maximum allowable voltage for constant current charging using the $k^{th}$ reference current $I_k$, as the battery voltage is higher than the $k^{th}$ reference voltage $V_k$ in the $k^{th}$ reference SOC range $\Delta SOC_k$, the degradation of the battery B may be accelerated. Accordingly, during constant current charging using the $k^{th}$ reference current $I_k$, when the battery voltage reaches the $k^{th}$ reference voltage $V_k$, it is necessary to adjust the magnitude of the charge current below the $k^{th}$ reference current $I_k$ to suppress the degradation of the battery B.

A second current profile 220 shown in FIG. 2 and a third voltage profile 330 shown in FIG. 3 exemplarily show a time-series, i.e., time-dependent change history of the battery current and the battery voltage monitored through the process of charging the degraded battery B during charging by applying the battery management method according to the present disclosure, respectively.

Referring to the third voltage profile 330, the control unit 140 monitors the battery voltage, the battery current and the battery SOC at a preset time interval (for example, 0.001 sec) during constant current charging using the $k^{th}$ reference current $I_k$. The control unit 140 may change from constant current charging using the $k^{th}$ reference current $I_k$ to constant voltage charging using the $k^{th}$ reference voltage $V_k$ in response to the battery voltage having reached the $k^{th}$ reference voltage $V_k$ before the SOC of the battery B reaches the upper limit value $S_k$ of the $k^{th}$ reference SOC range $\Delta SOC_k$. Accordingly, the battery B is charged at constant voltage of the $k^{th}$ reference voltage $V_k$ from the time when the battery voltage reaches the $k^{th}$ reference voltage $V_k$ to the time when the SOC of the battery B reaches the upper limit value $S_k$ of the $k^{th}$ reference SOC range $\Delta SOC_k$. Referring to the second current profile 220, during constant voltage charging using the $k^{th}$ reference voltage $V_k$, the battery current gradually reduces with the gradually increasing battery voltage.

For example, constant current charging using the second reference current $I_2$ is performed over the SOC range of $S_1 \sim Z_2$ [%], and subsequently, constant voltage charging is performed over the SOC range of $Z_2 \sim S_2$ [%] (second constant voltage charging range) while keeping the battery voltage of the battery B equal to the second reference voltage $V_2$. Additionally, it can be seen from the second current profile 220 that the battery current gradually reduces from the second reference current $I_2$ while the battery B is being charged at constant voltage by the second reference voltage $V_2$.

The control unit 140 may update the charge map including the first current profile 210 of FIG. 2 and the first voltage profile 310 of FIG. 3 based on the battery voltage and the battery current monitored while the charging procedure for at least one of the first to fourth reference SOC ranges $\Delta SOC_1 \sim \Delta SOC_4$ is being performed in a sequential order.

Specifically, the control unit 140 may determine a $k^{th}$ average current from the time-series (referred to as 'current history') of the battery current monitored over a k constant voltage charging period which is a charging period of the $k^{th}$ constant voltage charging range $Z_k \sim S_k$. The $k^{th}$ average current may be an average of battery currents sensed repeatedly at a preset time interval for the $k^{th}$ constant voltage charging period. Accordingly, the $k^{th}$ average current is smaller than the $k^{th}$ reference current $I_k$.

Subsequently, the control unit 140 may update the $k^{th}$ reference current $I_k$ of the charge map based on the $k^{th}$ average current. The current $I_{11} \sim I_{14}$ of the third current profile 230 of FIG. 2 may be the result of updating the reference current $I_1 \sim I_4$ of the charge map, respectively.

The control unit 140 may update the $k^{th}$ reference current $I_k$ to be equal to the $k^{th}$ average current. For example, referring to FIG. 2, where the second reference current $I_2 = 120$ A, the second average current=100 A, the second reference current $I_2$ of 120 A is changed to $I_{12}$ of 100 A.

Alternatively, the control unit 140 may update the $k^{th}$ reference current $I_k$ to be equal to the sum of multiplication of the $k^{th}$ reference current $I_k$ and a first weight and multiplication of the $k^{th}$ average current and a second weight. Each of the first weight and the second weight may be a positive number of less than 1, and the sum of the first weight and the second weight may be 1. For example, where the second reference current $I_2$=120 A, the second average current=100 A, the first weight=0.4 and the second weight=0.6, the second reference current $I_2$ of 120 A may be changed to $I_{12}$ of 108 A and recorded in the charge map.

Meanwhile, despite not having been performed for each of all the reference SOC ranges $\Delta SOC_1 \sim \Delta SOC_4$ in a sequential order, the charging procedure according to the above-described battery management method often ends. For example, charging may start before the battery B is fully discharged, or a vehicle user may separate a charging cable from the electric vehicle 1 before constant current charging is changed to constant voltage charging. In this case, it is possible to update the reference current corresponding to some reference SOC ranges having undergone the charging procedure as described above, but it may be impossible to update the reference current corresponding to the remaining reference SOC ranges.

To solve the above-described problem, in case that charging starts when the SOC of the battery B is larger than $S_0$, or charging ends when the SOC of the battery B is smaller than $S_4$, the control unit 140 may update the reference current associated with each of the remaining reference SOC ranges based on update information of at least one of the reference SOC ranges $\Delta SOC_1 \sim \Delta SOC_4$.

Assume that only the $k^{th}$ reference current $I_k$ corresponding to the $k^{th}$ reference SOC range $\Delta SOC_k$ was updated to $I_{1k}$ according to the above-described battery management method. The control unit 140 may determine a ratio of $I_{1k}$ to $I_k$, and update each of the remaining reference currents based on the determined ratio. For example, when the second reference current $I_2$ is updated from 120 A to 100 A, the control unit 140 may update the first reference current $I_1$, the third reference current $I_3$ and the fourth reference current $I_4$ by multiplying each of the first reference current $I_1$, the third reference current $I_3$ and the fourth reference current $I_4$ by $^{100}/_{120}$=⅚.

Assume that each of i and j is a natural number, i≤j, i is 2 or greater or j is less than n. Only the $i^{th}$ to $j^{th}$ reference currents $I_i \sim I_j$ corresponding to the $i^{th}$ to $j^{th}$ reference SOC ranges $\Delta SOC_i \sim \Delta SOC_j$ are updated from $I_i \sim I_j$ to $I_{1i} \sim I_{1j}$ according to the battery management method (see FIG. 4), respectively, and the charging procedure may end. Then, the control unit 140 may update each of the remaining reference currents using the following equation.

$$I_{1x} = I_x \times \frac{1}{(j-i+1)} \times \sum_{y=i}^{j} \frac{I_{1y}}{I_y} = I_x \times \mu_{avg}$$

In the above equation, x is a natural number of n or smaller except i to j, $I_x$ is the reference current before update, and $I_{1x}$ is the updated reference current. $\mu_{avg}$ is an average ratio of the $i^{th}$ to $j^{th}$ updated reference currents $I_{1i} \sim I_{1j}$ to the $i^{th}$ to $j^{th}$ reference currents $I_i \sim I_j$.

In an example, when i=2, j=3, n=4, $i_1$=150 A, $i_2$=120 A, $i_{12}$=100 A, $i_3$=110 A, $i_{13}$=95 A, $i_4$=90 A, $i_{11}$=$i_1 \times ½ \times \{^{100}/_{120}+ ^{95}/_{110}\}$ A≈127 A, $i_{14}$=$i_4 \times ½ \times \{^{100}/_{120}+^{95}/_{110}\}$ A≈76 A.

Figure 4:
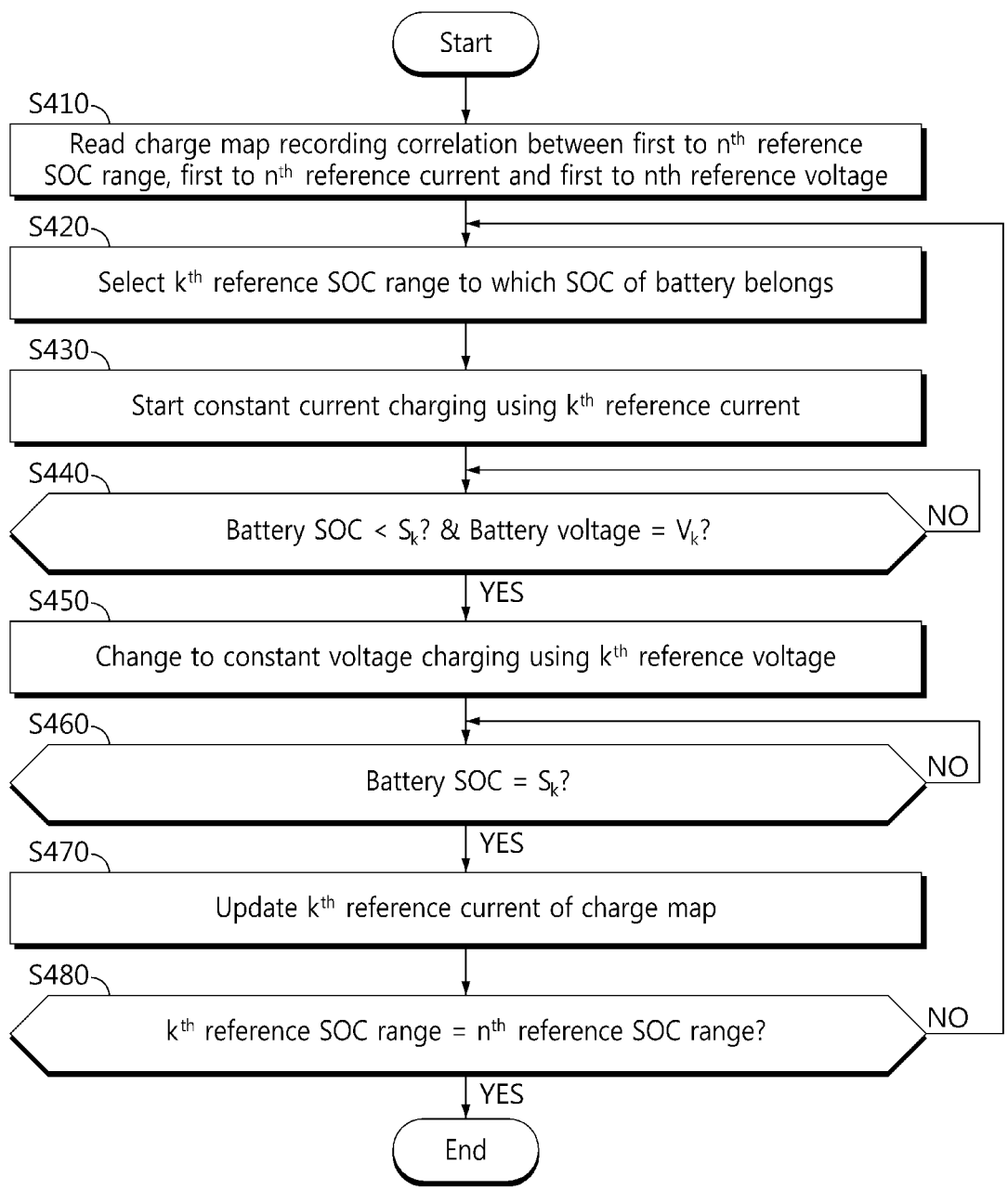
FIG. 4 is a flowchart exemplarily showing a battery management method according to a first embodiment of the present disclosure.

FIG. 4 is a flowchart exemplarily showing a battery management method according to a first embodiment of the present disclosure.

Referring to FIGS. 1 to 4, in step S410, the control unit 140 reads a charge map recording a correlation between first to $n^{th}$ reference SOC ranges $\Delta SOC_1 \sim \Delta SOC_n$, first to $n^{th}$ reference currents $I_1 \sim I_n$ and first to $n^{th}$ reference voltage $V_1 \sim V_n$ from the memory unit 120 in response to a charge start command.

In step S420, the control unit 140 selects a $k^{th}$ reference SOC range $\Delta SOC_k$ to which the SOC of the battery B belongs among the first to $n^{th}$ reference SOC ranges $\Delta SOC_1 \sim \Delta SOC_n$. For example, when the SOC of the battery B is $S_1$ or more and less than $S_2$, the second reference SOC range $\Delta SOC_2$ is selected.

In step S430, the control unit 140 starts constant current charging using a $k^{th}$ reference current $I_k$ corresponding to the $k^{th}$ reference SOC range $\Delta SOC_k$.

In step S440, the control unit 140 determines whether the battery voltage reached a $k^{th}$ reference voltage $V_k$ corresponding to the $k^{th}$ reference SOC range $\Delta SOC_k$ before the SOC of the battery reached the upper limit value $S_k$ of the $k^{th}$ reference SOC range $\Delta SOC_k$. When a value of the step S440 is "YES", step S450 is performed.

In the step S450, the control unit 140 changes from constant current charging using the $k^{th}$ reference current $I_k$ to constant voltage charging using the $k^{th}$ reference voltage $V_k$.

In step S460, the control unit 140 determines whether the SOC of the battery reached the upper limit value $S_k$ of the $k^{th}$ reference SOC range $\Delta SOC_k$. When a value of the step S460 is "YES", step S470 is performed.

In the step S470, the control unit 140 updates the $k^{th}$ reference current $I_k$ of the charge map based on a current history of the battery current over a charging period of constant voltage charging using the $k^{th}$ reference voltage $V_k$.

In step S480, the control unit 140 whether the $k^{th}$ reference SOC range $\Delta SOC_k$ is the $n^{th}$ reference SOC range $\Delta SOC_n$. That is, the control unit 140 determines whether the SOC of the battery B reached the maximum SOC $S_n$ of multi-stage constant-current charging defined by the charge map. When the value of the step S480 is "NO", the method returns to the step S420. When the value of the step S480 is "YES", the method of FIG. 4 may end.

For reference, when an update condition is not satisfied, but the charge start command is received, the steps S440~S470 may be omitted from the method of FIG. 4.

The method of FIG. 4 may start in response to the charge start command when the predetermined update condition is satisfied. The update condition is for preventing the unnecessarily frequent updates of the charge map. The update condition indicates an increase in the degree of degradation of the battery B over a predetermined level, and may be, for example, an increase in the accumulated capacity of the battery B by at least a first threshold (for example, 100 Ah [ampere-hour]) than the accumulated capacity at the previous update time, an increase in the cycle number of the battery B by at least a second threshold (for example, 50 times) than the cycle number at the previous update time, a reduction in the capacity retention rate of the battery B by at least a third threshold (for example, 5%) than the capacity retention rate at the previous update time, and an increase by at least a threshold time (for example, a month) from the previous update time.

Figure 5:
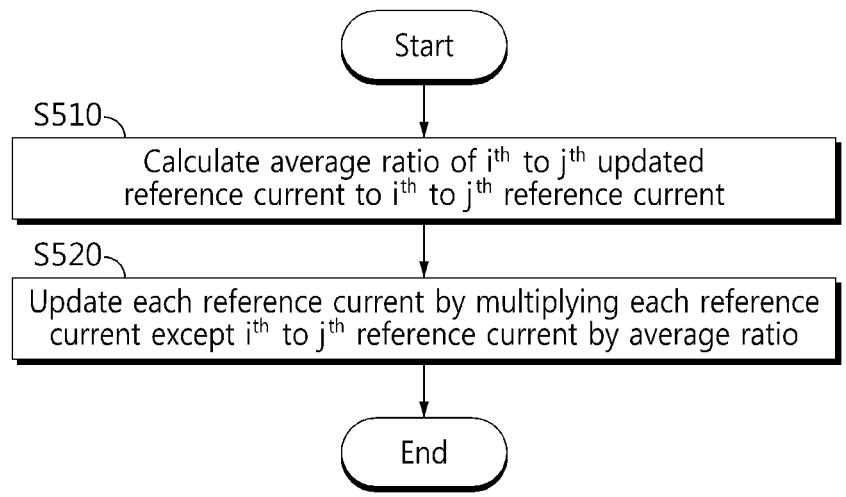
FIG. 5 is a flowchart exemplarily showing a battery management method according to a second embodiment of the present disclosure.

FIG. 5 is a flowchart exemplarily showing a battery management method according to a second embodiment of the present disclosure. When only the $i^{th}$ to $j^{th}$ reference currents $I_i \sim I_j$ among the first to $n^{th}$ reference currents $I_1 \sim I_n$ are updated through the method of FIG. 4, the method of FIG. 5 may be used to update each of the remaining reference currents. That is, the method of FIG. 5 may be performed when the battery B is charged in only some of the entire SOC range of $S_0 \sim S_n$ (for example, $Z_1 \sim S_3$ of FIG. 2)

by the method of FIG. 4. As described above, each of i and j is a natural number, i<j, and i is 2 or greater, or j is less than n.

In step S510, the control unit 140 calculates an average ratio of the $i^{th}$ to $j^{th}$ updated reference currents $I_{1i}$~$I_{1j}$ to the $i^{th}$ to $j^{th}$ reference currents $I_i$~$I_j$ (see $\mu_{avg}$ of the above equation).

In step S520, the control unit 140 updates each reference current except the $i^{th}$ to $j^{th}$ reference currents $I_i$~$I_j$ among the first to $n^{th}$ reference currents $I_1$~$I_n$ by multiplying each reference current by the average ratio.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery management system, comprising:
a voltage sensor configured to measure a battery voltage of a battery;
a current sensor configured to measure a battery current of a battery;
a controller; and
memory configured to store a charge map recording a correlation between first to $n^{th}$ reference state of charge (SOC) ranges, first to $n^{th}$ reference currents and first to $n^{th}$ reference voltages for multi-stage constant-current charging, respectively,
the memory having programmed thereon instructions that, when executed by the controller, cause the controller to:
in response to a charge start command, start constant current charging using a $k^{th}$ reference current corresponding to a $k^{th}$ reference SOC range, wherein an SOC of the battery is within the $k^{th}$ reference SOC range;
change from the constant current charging to constant voltage charging using a $k^{th}$ reference voltage in response to the battery voltage having reached the $k^{th}$ reference voltage corresponding to the $k^{th}$ reference SOC range before the SOC of the battery reaches an upper limit value of the $k^{th}$ reference SOC range during the constant current charging; and
update the $k^{th}$ reference current of the charge map based on a time-series of the battery current in a charging period of the constant voltage charging in response to the SOC of the battery having reached the upper limit value of the $k^{th}$ reference SOC range during the constant voltage charging,
wherein n is a natural number of 2 or greater, and k is a natural number of n or smaller.

2. The battery management system according to claim 1, wherein the instructions are configured to cause the controller to:
determine an average current in the charging period from the time-series of the battery current; and
update the $k^{th}$ reference current to be equal to the average current.

3. The battery management system according to claim 1, wherein the instructions are configured to cause the controller to:
determine an average current in the charging period from the time-series of the battery current; and
update the $k^{th}$ reference current to be equal to a sum of (i) the $k^{th}$ reference current multiplied by a first weight and (ii) the average current multiplied by a second weight.

4. The battery management system according to claim 3, wherein each of the first weight and the second weight is a positive number less than 1, and
a sum of the first weight and the second weight is 1.

5. The battery management system according to claim 1, wherein the instructions are configured to cause the controller to update each remaining reference current among the first to $n^{th}$ reference currents except the $k^{th}$ reference current based on a ratio between the updated $k^{th}$ reference current and the $k^{th}$ reference current.

6. A battery pack comprising the battery management system according to claim 1.

7. An electric vehicle comprising the battery pack according to claim 6.

8. A battery management method, comprising:
in response to a charge start command, starting, by a controller, constant current charging using a $k^{th}$ reference current corresponding to a $k^{th}$ reference state of charge (SOC) range, wherein an SOC of the battery is within a $k^{th}$ reference SOC range, and wherein the $k^{th}$ reference current corresponds to the $k^{th}$ reference SOC range in a charge map correlating first to $n^{th}$ reference SOC ranges with first to $n^{th}$ reference currents and first to $n^{th}$ reference voltages for multi-stage constant-current charging;
changing, by the controller, from the constant current charging to constant voltage charging using a $k^{th}$ reference voltage in response to a battery voltage having reached the $k^{th}$ reference voltage corresponding to the $k^{th}$ reference SOC range before the SOC of the battery reaches an upper limit value of the $k^{th}$ reference SOC range during the constant current charging; and
updating, by the controller, the $k^{th}$ reference current of the charge map based on a time-series of a battery current in a charging period of the constant voltage charging in response to the SOC of the battery having reached the upper limit value of the $k^{th}$ reference SOC range during the constant voltage charging,
wherein n is a natural number of 2 or greater, and k is a natural number of n or smaller.

9. The battery management method according to claim 8, wherein updating the $k^{th}$ reference current of the charge map comprises:
determining, by the controller, an average current in the charging period from the time-series of the battery current; and
updating, by the controller, the $k^{th}$ reference current to be equal to the average current.

10. The battery management method according to claim 8, further comprising:

updating, by the controller, each remaining reference current among the first to $n^{th}$ reference currents except the $k^{th}$ reference current based on a ratio between the $k^{th}$ reference current and the updated $k^{th}$ reference current.

* * * * *